Patented Dec. 12, 1950

2,533,250

UNITED STATES PATENT OFFICE 2,533,250

ESTER OF 1,5-PENTANEDIOL AND ITS PREPARATION

Stanford J. Hetzel, Cheltenham, Pa., assignor to Sun Oil Company, Philadelphia, Pa., a corporation of New Jersey No Drawing. Application August 25, 1948, Serial No. 46,185

5 Claims. (Cl. 260—410.6)

The present invention relates to a novel compound derived from 1,5-pentanediol

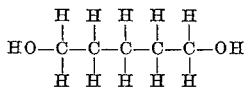

specifically to 1,5-pentanediol dikerosenate and to its method of preparation.

According to the invention 1,5-pentanediol dikerosenate is prepared from 1,5-pentanediol and kerosene acids.

The kerosene acids are prepared by oxidizing a kerosene fraction to convert certain compounds present in the kerosene to corresponding oxygenated compounds or materials. During the oxidation hydroxy compounds, acids, ketones etc. and reaction products of these are formed. The acids formed may be keto or hydroxy acids. These may interact with each other. Other reactions may also take place during the oxidation of the kerosene fraction. The procedure for oxidizing kerosene can be that disclosed in United States Patents Nos. 2,153,302 and 2,168,699.

According to the invention the foregoing ester of 1,5-pentanediol was prepared by refluxing in the presence of a trace of para-toluene sulfonic acid 1,5-pentanediol and the aforementioned kerosene acids in the presence of a solvent for example commercially available xylenes.

To suppress the formation of partial ester an excess of the kerosene acids should be employed. In order to determine the quantity of acid to be added to the reaction the acid number of the kerosene acids is determined (A. S. T. M. D663—46T) and from it the approximate molecular weight of the acid. The average molecular weight of the kerosene acids used was about 160.

Other acid catalysts can be employed. For example sulfuric acid, hydrochloride acid and other acids commonly used in esterification processes can be employed in minor quantities.

Other solvents for example toluene or even higher boiling aromatics can be employed. Other solvents inert under the conditions of the reaction can be used.

The following is an example of the preparation of the ester of this invention:

Example 160 grams kerosene acids (about 1.0 mole) was heated under refluxing conditions with 52 grams (0.5 mole) 1,5-pentanediol and 250 cc. xylene for 24 hours. Two grams para-toluene sulfonic acid was used as a catalyst. Water from the reaction was removed continuously in a Dean-Stark tube. The reaction product was washed with 20% aqueous solution of sodium carbonate and dried over anhydrous calcium chloride. Xylene was removed and the remainder of the reaction mass was distilled taking three cuts as follows:

|  | Grams |
|---|---|
| Cut # 1: 120° C.–200° C./4 mm. Hg (unreacted 1,5-pentanediol and half-ester) | 32 |
| Cut # 2: 200° C.–250° C./4 mm. Hg (product of the invention) | 53 |
| Cut # 3: Boiling above 250° C./4 mm. Hg (residue) | 37 |

The product of this invention has a light red amber color, a boiling range of 200° C.–250° C. at 4 mm. Hg, a refractive index $$N\frac{20°\ C.}{C}1.4888$$

and a density $$D\frac{20°\ C.}{4}.9927$$

The ester of this invention has been found useful as a plasticizer for polyvinyl resins such as polyvinyl chloride and polyvinyl chloride-polyvinyl acetate mixtures.

In copending application for patent Serial No. 46,190 filed by the instant inventor August 25, 1948, there is described and claimed a polyvinyl resin in plasticized composition with the ester of this invention. In copending application for patent Serial No. 183,628 filed by the instant inventor September 7, 1950, there is described and claimed diesters of a 1,5-pentanediol and an aliphatic monocarboxylic acid containing at least 6 carbon atoms, or an aromatic monocarboxylic acid having the carboxylic group joined directly to the aromatic ring; vinyl-type resins plasticized with such diesters are also described and claimed. Such esters and plasticized compositions are not included within the scope of the present invention, which is limited to 1,5-pentanediol dikerosenate and its preparation.

I claim:

1. 1,5-pentanediol dikerosenate.

2. The method of preparing 1,5-pentanediol dikerosenate which comprises refluxing equivalent proportions of 1,5-pentanediol and kerosene acids in the presence of an acid catalyst.

3. The method of preparing 1,5-pentanediol dikerosenate which comprises refluxing 1,5-pentanediol and an excess of kerosene acids to insure complete esterification in the presence of a solvent and in the presence of an acid catalyst.

4. Method according to claim 3 wherein the solvent employed is xylene and the acid catalyst is para-toluene sulfonic acid.

5. The method of preparing 1,5-pentanediol dikerosenate which comprises: refluxing 1,5-pentanediol and an excess of kerosene acids in the presence of xylene and para-toluene sulfonic acid; and separating from the reaction product by distillation a fraction comprising essentially 1,5-pentanediol dikerosenate.

STANFORD J. HETZEL.

REFERENCES CITED

The following references are of record in the file of this patent:

UNITED STATES PATENTS

| Number | Name | Date |
|---|---|---|
| 2,366,667 | Deebel | Jan. 2, 1945 |

FOREIGN PATENTS

| Number | Country | Date |
|---|---|---|
| 468,533 | Great Britain | July 7, 1937 |